(12) United States Patent
Haycock et al.

(10) Patent No.: US 11,964,602 B2
(45) Date of Patent: Apr. 23, 2024

(54) SUPPORT SYSTEM PROVIDING A SUPPORTING SURFACE FOR REST IN A VEHICLE

(71) Applicant: 2321154 Alberta Inc., Calgary (CA)

(72) Inventors: Nicholas Haycock, Bonnington Falls (CA); Peter Ernest James Root, Calgary (CA); Oyinkansolo Obikoya, Calgary (CA)

(73) Assignee: Backseat Bivy Ltd., Calgary (CA)

( * ) Notice: Subject to any disclaimer, the term of this patent is extended or adjusted under 35 U.S.C. 154(b) by 11 days.

(21) Appl. No.: 17/665,675

(22) Filed: Feb. 7, 2022

(65) Prior Publication Data
US 2022/0250522 A1   Aug. 11, 2022

Related U.S. Application Data

(60) Provisional application No. 63/146,896, filed on Feb. 8, 2021.

(51) Int. Cl.
*B60N 3/00* (2006.01)
*B60N 2/34* (2006.01)

(52) U.S. Cl.
CPC ............ *B60N 3/008* (2013.01); *B60N 2/345* (2013.01)

(58) Field of Classification Search
CPC .......... B60N 3/008; B60N 2/345; B60N 2/34; B60N 2002/363; B60N 2/60;
(Continued)

(56) References Cited

U.S. PATENT DOCUMENTS 4,232,413 A * 11/1980 Mongault ............... A47D 7/04
                                                               5/118
4,943,105 A *  7/1990 Kacar ................... B60N 2/2854
                                                              297/229
(Continued)

FOREIGN PATENT DOCUMENTS

FR      2483863 A1 * 12/1981
GB      2444700 A  *  6/2008  ............ B60N 2/345
(Continued)

OTHER PUBLICATIONS

Joytutus, Non-Inflatable Car Mattress, https://www.amazon.com/JOYTUTUS-Non-Inflatable-Mattress-Portable-Function/dp/B0BJ1P18PL/, Oct. 13, 2022 (Year: 2022).*
(Continued)

*Primary Examiner* — Amy R Weisberg
*Assistant Examiner* — Wenwei Zhuo
(74) *Attorney, Agent, or Firm* — Ryan W. Dupuis; Kyle R. Satterthwaite; Ade & Company Inc.

(57) ABSTRACT

A support system is provided for a passenger vehicle having front seats, rear seats, a front anchoring feature 3 forwardly of a gap between the front and rear seats and a rear anchoring feature 2 rearwardly of the gap. The support system includes (i) a panel structure, (ii) front end connectors connecting the panel structure to the front anchoring features of the vehicle, (iii) rear end connectors connecting the panel structure to the rear anchoring features of the vehicle, and (iv) a supporting arrangement providing support to laterally opposing side portions of the panel structure to resist inward displacement of the laterally opposing side portions of the panel structure towards one another when supporting a load on an upper supporting surface of the panel structure. The supporting surface extends the substantially horizontal supporting plat-
(Continued)

form at the rear of a vehicle for extending the resting or storage area of the vehicle.

18 Claims, 8 Drawing Sheets

(58) Field of Classification Search
CPC .... B60N 2/6018; B60N 2/6027; A47C 17/80; A47C 7/62; B60P 3/38; B60P 3/39
USPC ................. 296/69, 190.2, 156; 5/94, 118
See application file for complete search history.

(56) References Cited

U.S. PATENT DOCUMENTS

| | | | | |
|---|---|---|---|---|
| 7,261,375 | B2 * | 8/2007 | Godshaw | A01K 1/0272 297/229 |
| 8,596,317 | B1 * | 12/2013 | McNulty | B60R 5/04 224/160 |
| 11,612,255 | B1 * | 3/2023 | Ducato | A47C 17/80 5/118 |
| 2011/0248523 | A1 * | 10/2011 | Aebker | B60N 2/36 296/66 |
| 2012/0013158 | A1 * | 1/2012 | Randazzo | A01K 1/0272 297/250.1 |
| 2017/0217350 | A1 * | 8/2017 | Saunders | A47C 17/80 |
| 2019/0263306 | A1 * | 8/2019 | Welch | B60N 2/12 |

FOREIGN PATENT DOCUMENTS

| | | | | |
|---|---|---|---|---|
| KR | 200146036 | Y1 * | 6/1999 | ............ B60N 3/008 |
| KR | 100264900 | B1 * | 9/2000 | ............ B60N 3/008 |

OTHER PUBLICATIONS

Kim Seong-Yoon, "Assembling table for vehicle" KR 10-0264900 B1, machine translation, ip.com, Sep. 1, 2000 (Year: 2000).*

Hwang Tae-Jin, "Baby protected seat for a car", KR 20-0146036 Y1, machine translation, ip.com, Jun. 15, 1999 (Year: 1999).*

BarksBar, Pet Car Seat Cover with Seat Anchors for Cars, https://www.amazon.com/BarksBar-Anchors-Non-Slip-Backing-Regular/dp/B013VPZTAQ?; Aug. 13, 2015 (Year: 2015).*

FrontPet, Backseat Bridge Car Extender, https://www.amazon.com/Frontpet-Back-seat-Extender-Dogs/dp/B01F2GFKME/; Aug. 19, 2016 (Year: 2016).*

* cited by examiner

SUPPORT SYSTEM PROVIDING A SUPPORTING SURFACE FOR REST IN A VEHICLE

This application claims the benefit under 35 U.S.C. 119(e) of U.S. provisional application Ser. No. 63/146,896, filed Feb. 8, 2021.

FIELD OF THE INVENTION

The present invention relates to a support system providing a supporting surface substantially spanning the gap between the forward edge of a rear seat and the backs of front seats or other forward feature of the vehicle in which the supporting surface is able to support a load thereon, for example so that a typical person may rest comfortably within the vehicle.

BACKGROUND

Resting in vehicles, such as trains, cars, trucks, airplanes, boats, and the like is very common, yet typical vehicles include seats that lack substantially horizontal surface with sufficient width for a typical person or persons to comfortable rest. There have been many attempts to adapt the interior space of a vehicles to rest comfortably including, inflatable seat-gap fillers, interior hammocks, bed platforms, and car-tent attachments, to name a few. The existing state of the art often provides a substantially horizontal surface for a user to rest by installing some additional device on or around the seat or seats. Some require folding the seats to expand the horizontal surface allowing for resting longitudinally to the vehicle while others expand the seating portion of the seats enough so that one can comfortable rest across a row of seats. Most motor vehicles have only around 5 feet of horizontal length between the trunk/hatch of the vehicle and the most forward part of the rear seat when folded down. There is gap between the front edge of the rear seat and back edge of the front seat, that if utilized, would make the length in excess of 6 feet. The gap mentioned is typically reserved for an individual's legs and feet.

Each of the existing solutions mentioned previously includes timely setup periods, large upfront costs, confusing setup requirements, bulky storage options, excess weight, difficult construction requirements and in some cases, all of the drawbacks listed. It is the goal of the invention to solve each of these challenges.

SUMMARY OF THE INVENTION

The invention provides a support system by means of forming a supporting surface between a rearward seat and a frontward seat of a vehicle sufficient for a typical person or persons to rest comfortably when lying longitudinally and extending rearward from the front seats to the rear of the vehicle when the rear seat is folded down and across the vehicle when the rear seat or seats remain upright. This supporting surface may also be used to extend the substantially horizontal storage space of a vehicle and also prevent items from falling between the seats or forward to the drivers and front passenger seat area.

One or more support systems as described hereinafter in the detailed description may provide one or more of the following benefits: (i) an improved rest system for vehicles, (ii) an improved rest system that is fast to setup and remove from a vehicle and fast to disassembly or fold up for storage, (iii) an improved rest system that is intuitive for an average user to use, requiring little to no instructions, (iv) an improved rest system that can be installed with no special knowledge or specialized tools, (v) an improved rest system that is simple to make using readily available materials and manufacturing techniques, (vi) an improved rest system that is inexpensive to manufacture, (vii) an improved rest system that is easy to orient inside a vehicle, (viii) an improved rest system that is lightweight for installation, removal, and transportation, (ix) an improved rest system that is compact when fully setup, (x) an improved rest system that may be disassembled to a small enough size so that it may be transported in regular luggage or stored inside a typical vehicle without need to take it in and out. Further aspects and example embodiments are shown in accompanying drawings and/or described in the following detailed description.

According to one aspect of the present invention there is provided a support system for a highway passenger vehicle including at least one front seat, at least one rear seat spaced rearwardly of the at least one front seat to define a gap between the at least one front seat and the at least one rear seat, a front anchoring feature at a forward side of the gap and a rear anchoring feature at a rear side of the gap, the system comprising:

a panel structure arranged to span the gap from a front portion of the panel structure at the at least one front seat to a rear portion of the panel structure at the at least one rear seat of the vehicle, the panel structure defining an upper supporting surface spanning an upper side of the panel structure for supporting a load thereon;

one or more front end connectors joined to the front portion of the panel structure and arranged for connection to the front anchoring feature of the vehicle;

one or more rear end connectors joined to the rear portion of the panel structure and arranged for connection to the rear anchoring feature of the vehicle; and a supporting arrangement providing support to laterally opposing side portions of the panel structure to resist inward displacement of the laterally opposing side portions of the panel structure towards one another when supporting the load on the upper supporting surface of the panel structure.

In the illustrated embodiment, the supporting arrangement includes a forward rigid member spanning laterally under compression between the laterally opposing side portions of the panel structure in proximity to the front portion of the panel structure. In this instance, the one or more front end connectors are preferably joined to the panel structure at respective mounting locations spaced laterally inwardly from the laterally opposing side portions of the panel structure. Furthermore, when the panel structure protrudes forwardly beyond the forward rigid member, the one or more front end connectors may be connected to the panel structure at a location spaced forwardly from the forward rigid member.

Opposing ends of the forward rigid member may be captured by the panel structure to transfer lateral tension of the panel structure resulting from the load on the panel structure to a compressive load on the forward rigid member. Preferably, one of the opposing ends of the forward rigid member is captured by a backing panel which is operable between a working position capturing the end of the forward rigid member relative to the panel structure and a released position allowing the forward rigid member to be removed from the panel structure.

The forward rigid member may be removably supported on the panel structure and/or may be collapsible in length from a working position to a storage position, so as to more readily enable collapsing of the system for storage or transport.

The forward rigid member may be readily collapsible by folding opposing end portions of the forward rigid member towards one another in a first direction of folding from the working position and resists folding of the opposing end portions of the forward rigid member towards one another in a second direction of folding from the working position.

The supporting arrangement may further comprise a rear rigid member spanning laterally under compression between the laterally opposing side portions of the panel structure in proximity to the rear portion of the panel structure.

Preferably the panel structure protrudes rearwardly beyond the rear rigid member and the one or more rear end connectors are connected to the panel structure at a location spaced rearwardly from the rear rigid member.

The one or more rear end connectors may comprise a strap member which is adjustable in length.

The rear anchoring feature may be located on the one or more rear seats of the vehicle and wherein the one or more rear end connectors are arranged to be secured to the rear anchoring feature on the one or more rear seats of the vehicle.

The rear anchoring feature may also comprise a child seat anchor of the vehicle situated rearwardly of a seating surface of the one or more rear seats of the vehicle, in which the one or more rear connectors are adapted to mount onto the child seat anchor when the one or more rear seats are folded forwardly into a storage position of the one or more rear seats of the vehicle.

The one or more rear end connectors are preferably arranged to be readily mounted onto the panel structure at any one of a plurality of designated mounting locations laterally offset from one another across a width of the panel structure.

In the illustrated embodiment, the front anchoring feature is located on the vehicle at an elevated location spaced above the upper supporting surface of the panel structure when the support system is supported in the vehicle.

The front anchoring feature on the vehicle may comprise a headrest assembly on said at least one front seat of the vehicle.

Preferably said one or more front end connectors comprise a strap member which is adjustable in length.

When the system is used in combination with a vehicle in which the one or more rear seats are folded forwardly into a storage position such that a backside of the one or more rear seats defines an upper surface of the folded one or more rear seats, the system may further comprises: (i) the panel structure being supported against the upper surface of the folded one or more rear seats; (ii) the upper supporting surface of the panel structure extending forwardly from the upper surface of the folded one or more rear seats; and (iii) the upper supporting surface of the panel structure and the upper surface of the folded one or more rear seats forming a continuous supporting platform.

When the system is used in combination with a vehicle in which the one or more rear seats each include a seat bottom having an upper seating surface arranged to support a user seated thereon, the system may further comprise: (i) the panel structure being supported against the upper seating surface of the one or more rear seats such that the upper supporting surface of the panel structure and the upper seating surface of the one or more rear seats form a continuous supporting platform; (ii) the one or more rear end connectors being joined to the rear anchoring features at the rear of the upper seating surface of the one or more rear seats; and (iii) the one or more front end connectors being joined to the front anchoring features at an elevated location spaced above the upper supporting surface of the panel structure.

BRIEF DESCRIPTION OF THE DRAWINGS

Various embodiments of the invention will now be described in conjunction with the accompanying drawings in which.

In the drawings like characters of reference indicate corresponding parts in the different figures.

DETAILED DESCRIPTION

Figure 1:
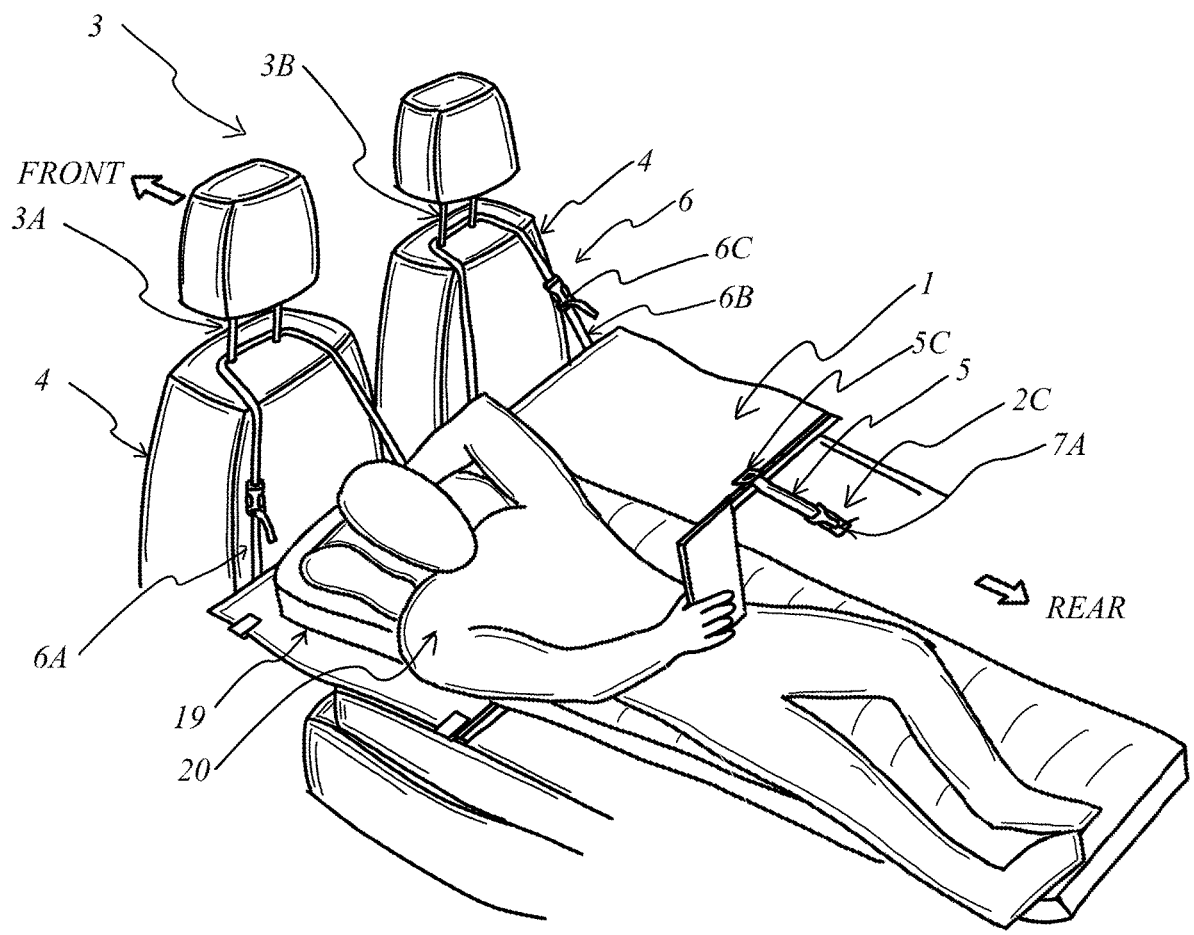
FIG. 1 is a perspective illustration of the support system installed in a vehicle spanning the unsupported gap between the folded down rear seats and the front seats so that a user can rest comfortably lengthwise inside the vehicle.
Figure 2:
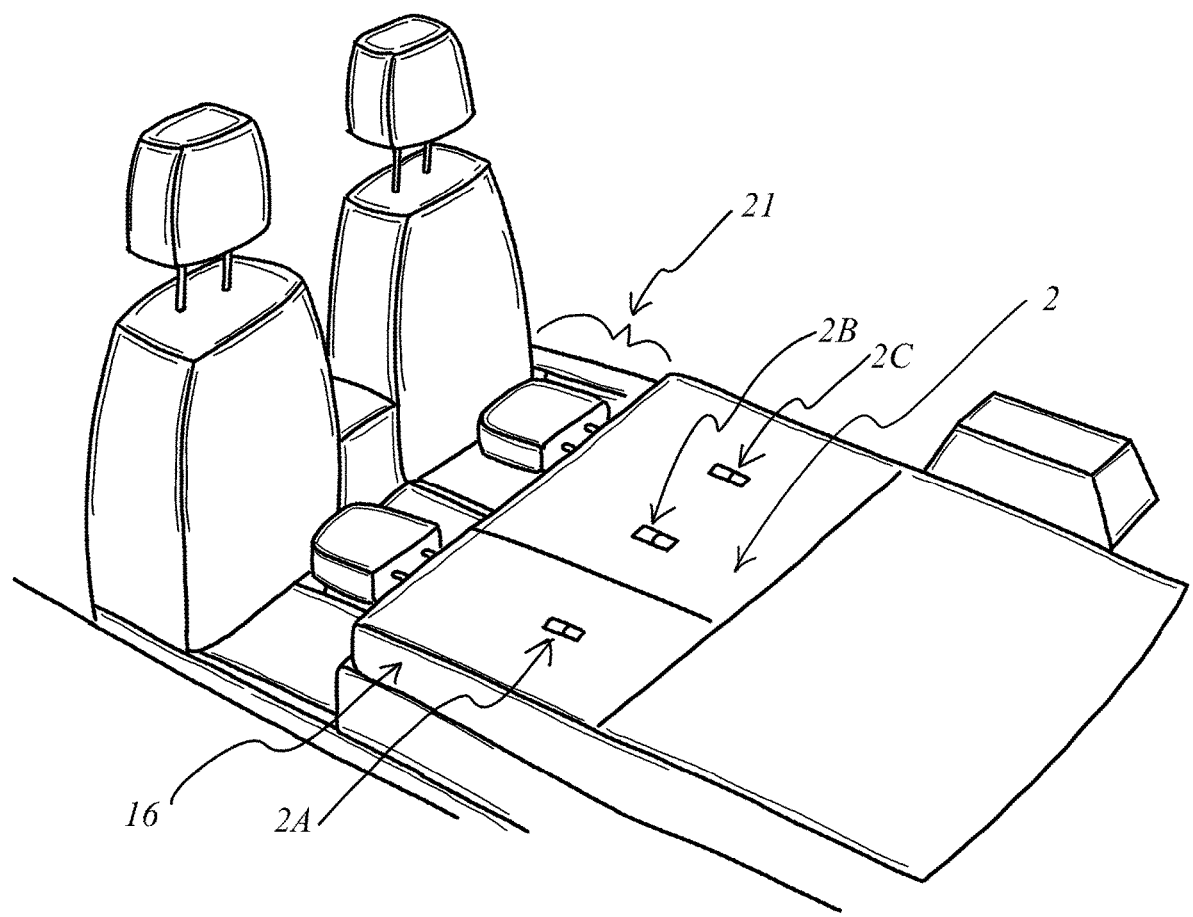
FIG. 2 is a perspective illustration showing the unsupported gap between the folded down rear seats and the front seats of a vehicle as well as the common safety loop features required for anchoring child car seats in a vehicle with the support system shown removed from the vehicle.

During the following description, specific details are provided in order to gain a more thorough understanding of the invention. However, the invention may be practiced without these particulars and possible omissions are often described. In some instances, well known elements have not been shown or described in detail to avoid obscuring the invention. Accordingly, the specifications and drawings are to be regarded as illustrative, rather than a restrictive sense.

As shown in the accompanying figures, a support system is provided for use with a highway passenger vehicle of the type typically including (i) at least one front seat 4, (ii) at least one rear seat 16 spaced rearwardly of the at least one front seat 4 to define a gap 21 in a longitudinal forward direction of the vehicle between the at least one front seat 4 and the at least one rear seat 16, (iii) a front anchoring feature 3 at a forward side of the gap (for example headrest support members 3A and 3B), and (iv) a rear anchoring feature 2 at a rear side of the gap (for example safety loop anchors 2A, 2B, and 2C commonly supported at the backside of the foldable seat back of the rear seats 16 for anchor child safety seats to the vehicle).

Figure 8:
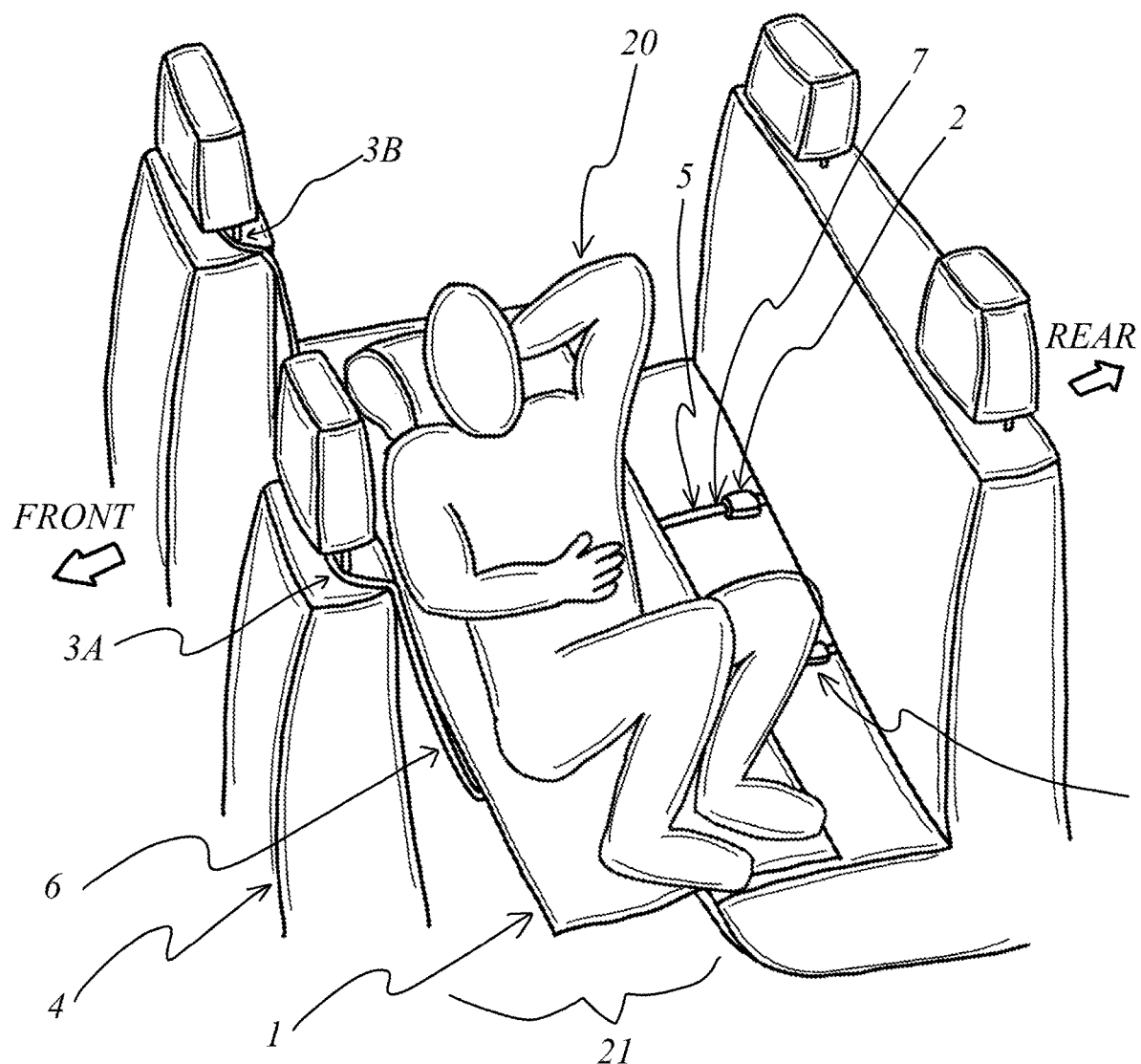
FIG. 8 is a perspective illustration of a non-limiting further embodiment of the support system installed in a vehicle spanning a gap between the front and rear seat or seats so that a user can rest comfortably transversely within the vehicle.

The support system according to the present invention generally includes (i) a panel structure 1, (ii) front end connectors 7 on connecting straps 6A and 6B connecting the panel structure 1 to the front anchoring features 3 of the vehicle, and (iii) rear end connectors 7 on connecting straps 5A and 5B connecting the panel structure 1 to the rear anchoring features 2 of the vehicle. In this manner, the panel structure is supported to span the gap 21 between the front and rear seats while defining an upper supporting surface spanning an upper side of the panel structure for supporting a load thereon. Furthermore, a supporting arrangement (for example rigid members 8 and 9) provides support to laterally opposing side portions of the panel structure 1 to resist inward displacement of the laterally opposing side portions of the panel structure towards one another when supporting the load on the upper supporting surface of the panel structure in use as shown in FIG. 1 and FIG. 8.

The panel structure 1 attaches rearward to a rear anchoring feature 2 in one or more places and forward to a front anchoring feature 3 in one or more places. In most applications the rear anchoring feature is the safety loop feature 2A & 2C for car seats found on the backside of the rear seats while in the upright position and on the top of the seats when in the folded position. Most modern vehicles must include these safety loop features 2A, 2B, & 2C to allow child or infant car seats to be used. It is noted that there are many rear anchoring features 2 that may be used to support the rear portion of the panel structure 1 that are described in more detail later in the description. The front anchoring features 3A & 3B are in most cases the collective pair of support members for the headrest, although any portion of the front seats 4 may be used. Other forward anchoring features 3 may be used, such as the steering wheel, ceiling handles, sun visor supports, rear-view mirror, seat belt strap, seat belt mechanism, or the like and will be described in more detail in further descriptions. The panel structure 1 is coupled to the anchoring features 2 and 3 via adjustable straps 5 and 6 that include the necessary end effectors 7 for the given anchoring feature. Where the rearward anchoring features 2 are safety loops 2A, 2B, or 2C, the end effector 7 would be a matching safety hook 7A. The adjustable straps 5 and 6 can change length using length adjustment features 5C and 6C, which will be described in detail further on.

In order to maintain a substantially flat and uniform supporting surface, rigid members 8 and 9 are utilized at least at the forward edge 11 of the panel structure and for at least a portion of its width. A typical implementation of the panel structure 1 material is a common outdoor fabric, such as polyester. The rigid members 8 and 9 can be typically made of stiffer materials, such as fiberglass, aluminum, or other plastics and are able to take modest compressive forces. Advantageously, rigid members may be present on both the forward edge 11 and rear edge 10 of the panel structure 1 and for a substantial portion of the width. Rigid members 8 and 9 may also be made of anisotropic materials or constructions such that they allow significant bending or folding in one direction but remain flat and transmit compressive forces in the opposite direction. The anisotropic embodiment of the rigid members will be described in more detail in the further embodiments section. A common example of such an anisotropic construction is a support leg on a collapsible table.

The rigid members 8 and 9 are prevented from moving side-to-side within the panel structure 1 by means of an optionally openable backing 12 at the limits of their length. Typical application has one backing 12A always closed, while the other 12B can be opened for installation of rigid members 8 and 9, and closed for use. The openable backing 12B can be made using Velcro, clasps, hooks or the like and is commonly known to those skilled in the art. In the preferred embodiment, the optionally openable backing 12A and 12B are made from a more robust materials than the panel structure 1, such as nylon webbing and include the openable feature in addition. The rigid members 8 and 9, coupled with the backing features 12A and 12B, allow for unequal loading of the panel structure 1 without collapse.

To support the forward section of the panel structure 1 adjustable straps 6 must anchor to the panel structure between the rigid members 8 and the forward anchoring features 3 so that loads applied to the panel structure transmit substantially equally to the collective anchoring features. Additionally, to support the rearward section of the panel structure 1 adjustable strap 5 must anchor to the panel structure between rigid member 9 and the anchoring features 2 so that loads applied to the panel structure transmit substantially equally to the collective anchoring features. The adjustable straps 5 and 6 may be selectively attachable to the panel structure 1 using a selectable attachment feature or features, such as item 13, at predefined spacing intervals or along a continuous feature such as a slot extending the width of the forward or rearward portion of the panel structure. The width spacing of the forward anchoring features 3, typically the headrest support members of the driver seat 3A and passenger seat 3B, follow industry averages. In most cases the spacing of the forward adjustable straps 6 can be rigidly attached to the forward width portion of the panel structure 1. Being rigidly mounted is advantageous to reduce weight and bulk for storage size and complexity during setup.

The width spacing of the rearward anchoring features 2 varies considerably between makes and models of vehicles and it is thus advantageous to allow rearward adjustable straps 5A and 5B to engage with selectable attachment features 13 for width adjustment. There are several common methods for selectively attaching an adjustable strap, such as buckles, hooks, clasps, carbineers, and the like, and can be attached to the matching loops, hook, clasps, or the like on the panel structure. The preferred embodiment 13A of a selectable attachment feature is a ladder lock 13B pushed through a loop of fabric 13C. The spaced loops may be advantageously made of a robust material such as nylon webbing.

The forward adjustable straps 6A and 6B, in the preferred embodiment, attach to the forward anchoring feature 3 using a loop around the support members of the driver's seat headrest 3A and passenger's seat headrest 3B. The loop is advantageously adjustable in length and selectively continuous. The adjustable strap 6 can be made with the use of a common side-release buckles or the like and a ladder lock 13B for length adjustment. The forward adjustable straps 6 may, in a further embodiment, be secured to the front seat 4 by wrapping a portion of the adjustable strap 6A or 6B around the body of the seat, then attaching a separate or integral strap 6D looping up to the support members of the headrest 3A or 3B from the frontside of the seat. This allows for better adjustment of the height of the forward side of the panel structure 1 using a strap length adjustment feature 6C such as a ladder lock or a side release buckle with length adjustment.

The rearward adjustable straps 5A and 5B, in the preferred embodiment, includes a flat-style hook 7A that nests within the standard safety loop feature 2A, 2B, or 2C present in the backside of rear seats in most modern vehicles. This maximizes comfort for the user 20 and experimentally is not felt while laying flat with or without an assisting mattress. For vehicles that do not include the standard safety loop feature 2A, 2B, or 2C, the rearward adjustable straps 5 may be clipped to common car features such as cargo hold down anchor rings, rear seat folding hinge, or tailgate/trunk edge features.

In a non-limited example of only a forward rigid member 8, the panel structure will function to provide support between four points connected with straight lines: interface of panel structure 1 and outer forward anchoring feature 3A, interface of panel structure 1 and outer forward anchoring feature 3B, interface of panel structure and rearward anchoring feature 2C, and interface of panel structure 1 rearward anchoring feature 2A. This will leave an unsupported portion of the gap between the folded down rear seat 16 and the front seats 4 outside the four points described previously, but will be faster to setup as it only needs one rigid member. In the non-limited example of two rigid members, one forward 8, and one rearward 9, the panel structure 1 will function to provide support between four points connected with straight lines regardless of the width position of the anchoring features: first end of forward rigid member 8A, second end of forward rigid member 8B, second end of rearward rigid member 9B, first end of rearward rigid member 9A. It is advantageous to provide extensive panel structure for the comfort of the user or users 20 as with the two rigid member example, yet advantageous to provide compact storage dimensions as with the one rigid member example.

The panel structure 1 may, for example, be of common flexible materials such as indoor and outdoor fabrics, twill, denier, oxford fabric, plastics, tarp material, or the like. It is advantageous to choose a panel structure fabric with minimal stretch to allow it to adequately transmit loads to the rigid members. A common, preferred materials is 600 denier Oxford fabric.

The rigid members 8 and 9 may be supported within the panel structure 1 material for none, a portion, or the entire length of the rigid members, and include a mechanism to substantially attach the rigid members to the panel structure, such as friction, internal locking feature, backings, or the like. In the preferred embodiment, the ends of rigid members 8 and 9 are backed by the optionally openable backings 12 described previously. The feature to support a portion of the length of a rigid member may be a tunnel 14, constructed out of the same material as the panel structure 1 or a more heavy-duty material such as nylon webbing previously described. The tunnel 14 may be constructed by folded the panel structure material back on itself and sewn to create a tunnel of sufficient width to allow the rigid members to pass through. It is also advantageous, but not required, to construct the rigid members 8 and 9 similar to separable tent poles, so that they may be collapsed smaller than their assembled length. This can be done with those familiar in the art. It is advantageous to include substantially smooth features 8C and 9C at the end of the rigid members 8 and 9 to aid in installation into the of the forward tunnel 14A and rearward tunnel 14B and to prevent premature wear and failure of the backing members 12.

With the rigid members 8 and 9 removed, the support fabric can be rolled or folded to a size much smaller than its installed footprint and stored easily. Additionally, if rigid members are made anisotropic and have the ability to fold 180 degrees in one direction while remaining stiff while unfolded, the support fabric and rigid members 8 and 9 combined may be folded to a size much smaller than its installed footprint and stored easily. While rolled up it can be kept as a unit by ties with clasping features 17 similar to an umbrella or while folded it can be kept together by a clasp strap 18 that can wrap around the entire folded panel structure and attach in place. Alternatively, a matching bag with adequate room for the support material 1 and rigid members 8 & 9 can be used to aid in storage.

Using a common camping air mattress 19, a resting or sleeping solution can be setup in minutes, cost less than a hotel, and be stored within a glovebox, solving the major issues with most vehicle rest systems.

Figure 3:
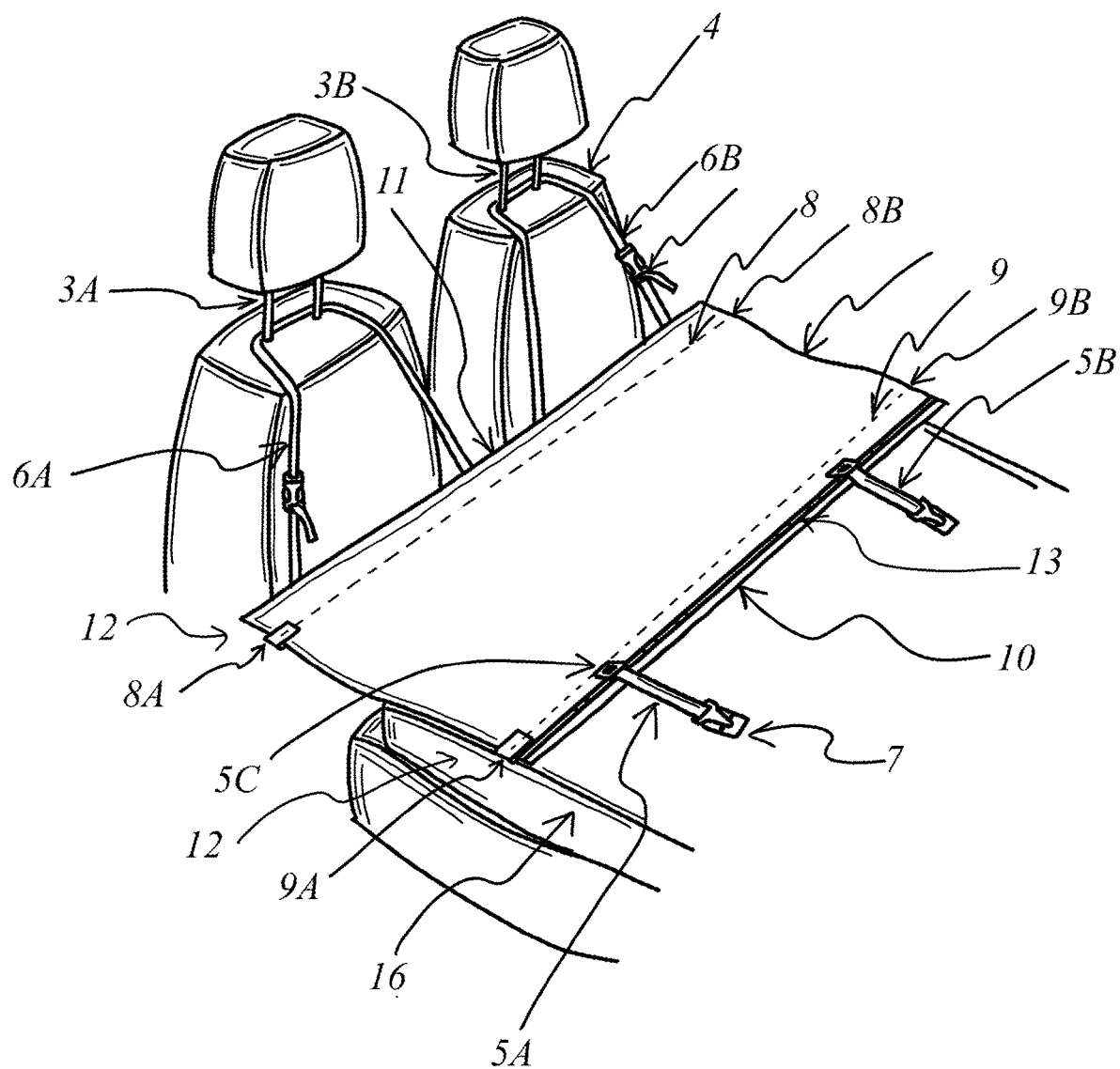
FIG. 3 is a perspective illustration showing the support system installed in a vehicle without a user present to better show the features of the vehicle.
Figure 4:
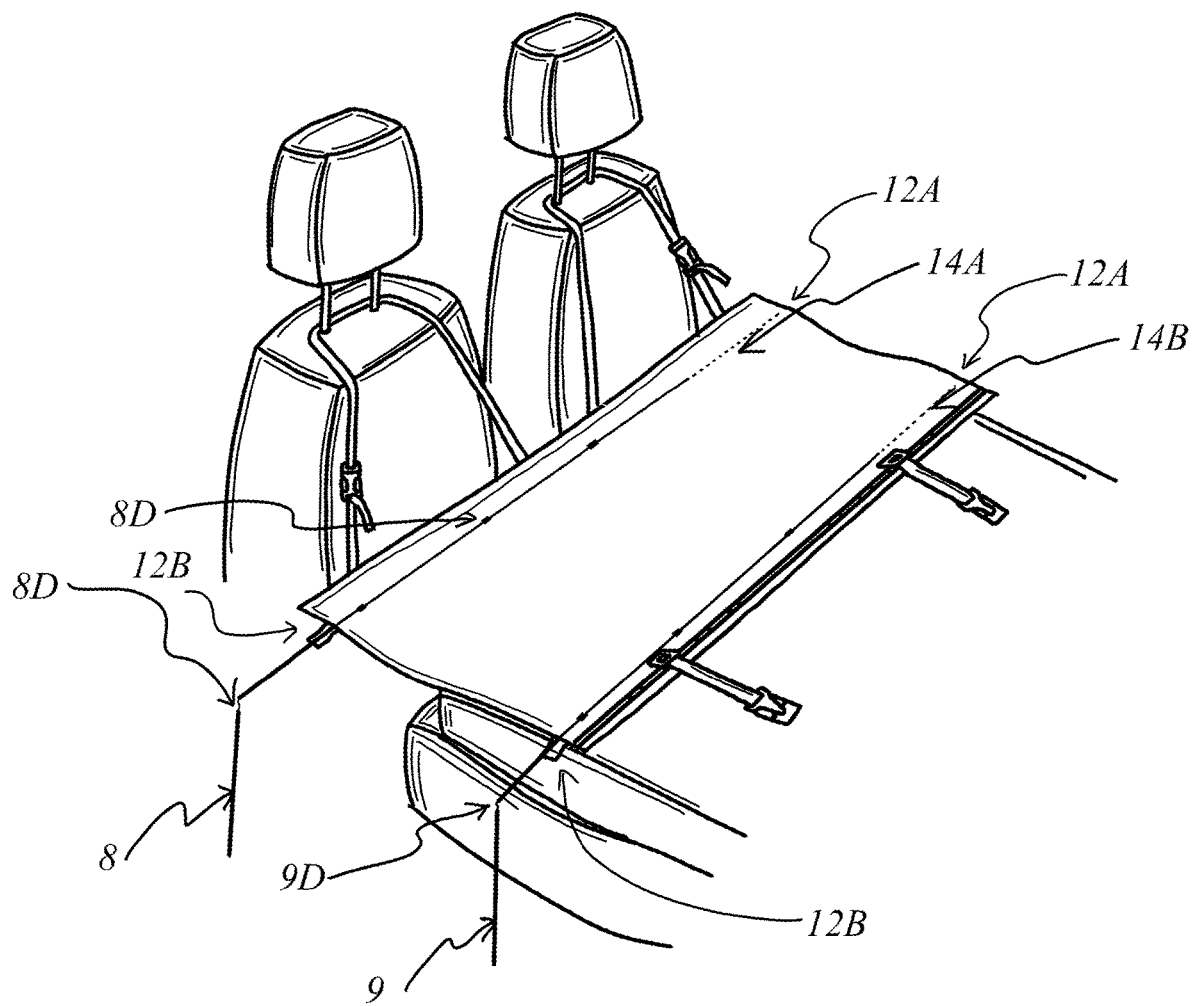
FIG. 4 is a perspective illustration showing the support system and highlighting the placement of the rigid members and the installation/removal capability.
Figure 5:
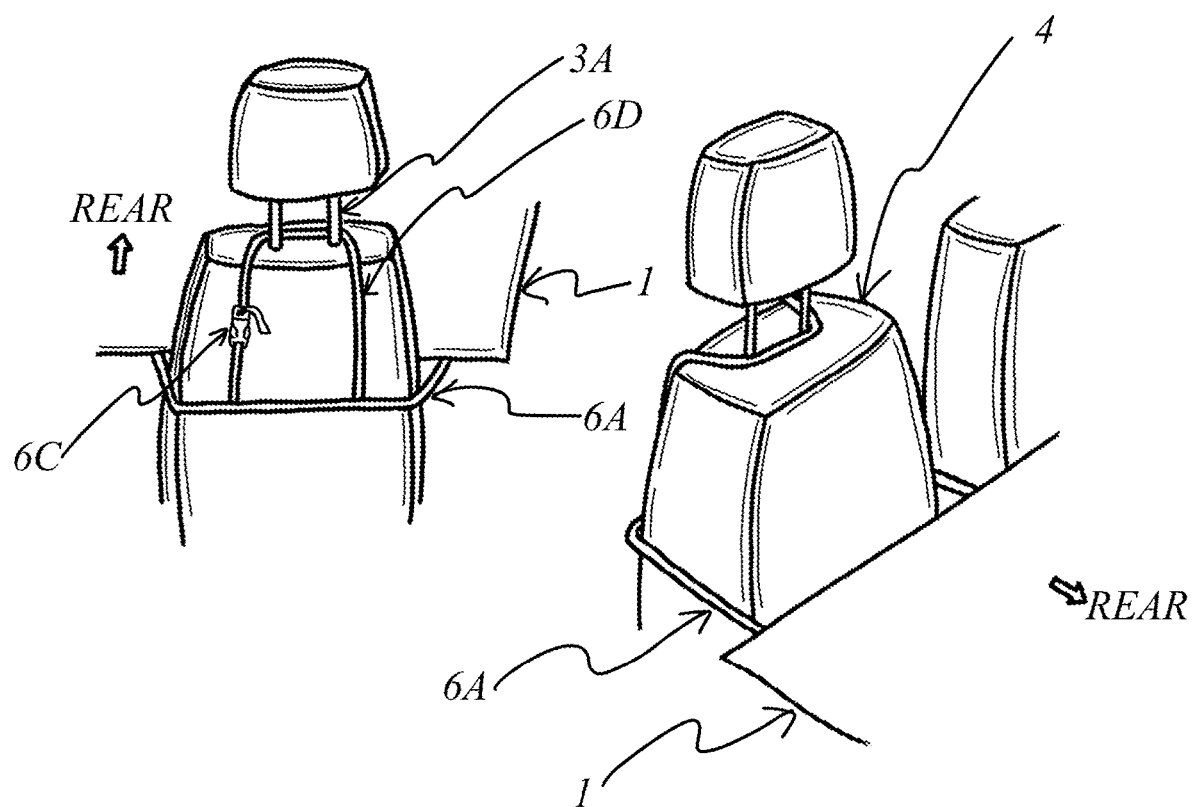
FIG. 5 illustrates a front perspective view and a rear perspective view of an adjustable strap system deployed on one of the front seats to vary the height of the front edge of the support system.
Figure 7:
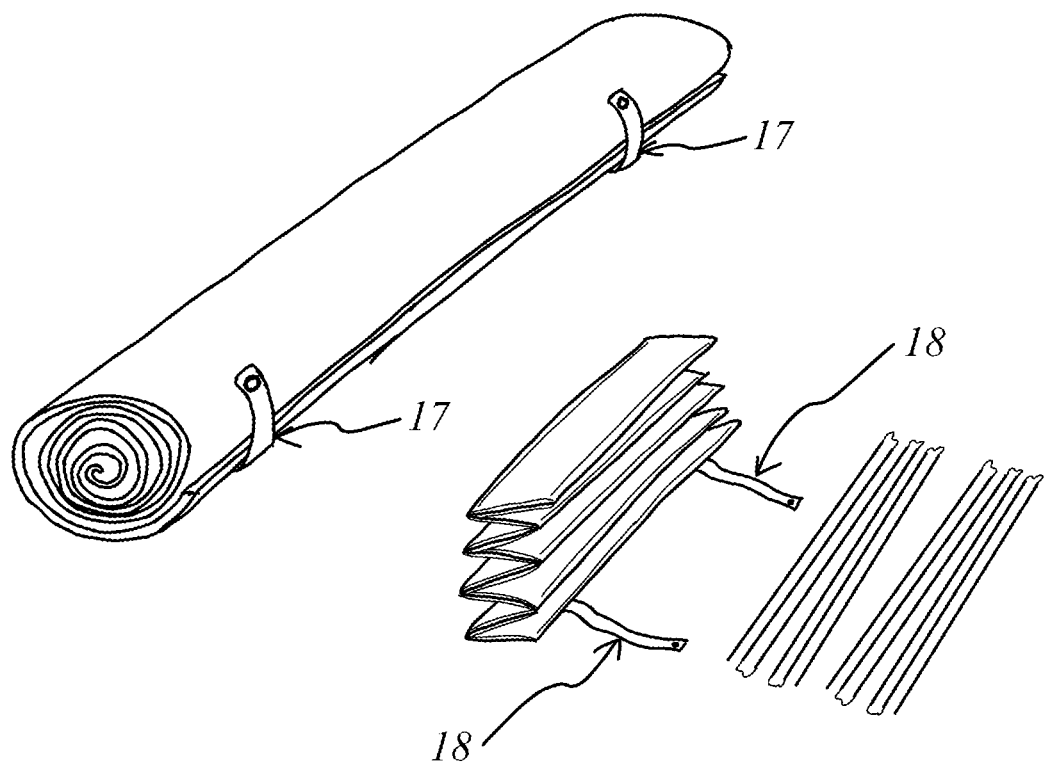
FIG. 7 is an illustrative view of the support surface and rigid members of the support system collapsed according to two separate embodiments of the support system.

According to a preferred embodiment of the support system, the panel structure is a rectangular sheet of flexible, pliable and/or foldable material which can be readily collapsed in length and/or width from a working position shown in FIG. 3 to a collapsed and stored position shown in FIG. 7. The panel structure defines a length in a longitudinal direction of the vehicle extending between a forward edge 11 and a rear edge 10 of the panel. Laterally opposing side portions of the panel structure 1 are situated along laterally opposing side edges of the panel structure that extend longitudinally between the forward edge 11 and the rear edge 10 such that a width of the panel is defined in a lateral direction extending between the opposing side edges.

The forward rigid member 8 is supported on the panel structure at a location in proximity to the forward edge 11 so as to define a front portion of the panel structure extending forwardly beyond the forward rigid member 8 from the forward rigid member 8 to the forward edge 11. Two front end connectors are shown supported on the front portion of the panel structure in which the front end connectors comprise respective front straps 6A and 6B incorporating a suitable fastening structure 6C to enable the front straps to be adjustable in length. The front straps are secured to the panel portion at a location spaced forwardly from the forward rigid member at the forward edge 11. In addition, the front straps of the front end connectors are secured to the panel structure at respective mounting locations which are spaced laterally inward from the laterally opposing side edges of the panel structure such that the forward rigid member 8 protrudes laterally outwardly beyond any of the front end connectors at both ends of the forward rigid member to laterally extend the supporting surface beyond the width between the front end connectors and/or the front anchoring features of the vehicle.

The opposing ends 8A and 8B of the forward rigid member 8 are captured by the panel structure in a manner to transfer load from the panel structure to the forward rigid member. More particularly, a tunnel 14 is formed between layers of material in the panel structure to receive the forward rigid member 8. The tunnel 14 is enclosed at opposing ends by suitable backing members including a first backing member 12A forming a closed pocket at one end of the tunnel 14 and a second backing member 12B comprising a panel which is operable relative to the panel structure between the working position capturing the end of the forward rigid member relative to the panel structure as a closed pocket and a released position forming an unobstructed opening at the end of the tunnel 14 through which the forward rigid member can be removed from the tunnel in the panel structure.

Once removed from the panel structure, the forward rigid member 8 is collapsible in length measured in the lateral direction of the panel structure from a working position to a storage position of the forward rigid member. The collapsing of the length of the forward rigid member 8 can be accomplished by various means as described above. For example, in one instance the forward rigid member 8 may be formed in sections which are collapsed in length by folding opposing end portions of the forward rigid member towards one another in a first direction of folding from the working position, while the structure of the forward rigid member is arranged to resist folding of the opposing end portions of the forward rigid member towards one another in an opposing second direction of folding from the working position. In this instance, the forward rigid member is inserted into the panel structure such that the first direction of folding is oriented downward. Any load applied at an intermediate location onto the support system thus tends to act in a direction that urges the forward rigid member to be folded in the second direction of folding that is resisted by the arrangement of the structure of the forward rigid member 8.

With further reference to the preferred embodiments, the support system further includes the rear rigid member 9 supported relative to the panel structure in proximity to the rear portion of the panel structure. More particularly, the rear rigid member 9 defines a rear portion of the panel structure extending rearwardly beyond the rear rigid member 9 from the rigid member 9 to the rear edge 10. Two rear end connectors are shown supported on the rear portion of the panel structure in which the rear end connectors comprise respective rear straps 5A and 5B supporting respective hooks 7A at the rear ends thereof for connection to suitable anchors defining the rear anchoring features 2 on the rear seats 16 of the vehicle. Similarly to the front rigid member 8, the rear rigid member 9 spans laterally under compression between the laterally opposing side portions of the panel structure. The opposing ends 9A and 9B of the rear rigid member 9 are captured by the panel structure within a respective tunnel including a first backing member 12A forming a closed pocket at one end of the tunnel 14 and a second backing member 12B comprising a panel operable between a working position and a released position similarly to the forward rigid member 8. More particularly, each of the forward and rear rigid members 8 and 9 are captured by the panel structure to transfer lateral tension of the panel structure resulting from the load on the panel structure to a compressive load on the forward rigid member. The rear rigid member 9 can also be collapsed in length similarly to the forward rigid member 8.

The rear end connectors including the straps 5A and 5B are mounted onto the rear portion of the panel structure at the rear edge 10 at a location spaced rearwardly on the panel structure from the mounting location of the rear rigid member 9. In addition, the straps 5A and 5B forming the rear end connectors are mounted onto the panel structure at any one of a plurality of designated mounting locations laterally offset from one another across a width of the panel structure. In this manner when the rear anchoring feature is located at different locations on different vehicles, the rear end connectors can be mounted onto the panel structure 1 at a location that aligns each rear end connector with a corresponding rear anchoring feature on the vehicle in the lateral direction of the panel structure 1.

Figure 6A:
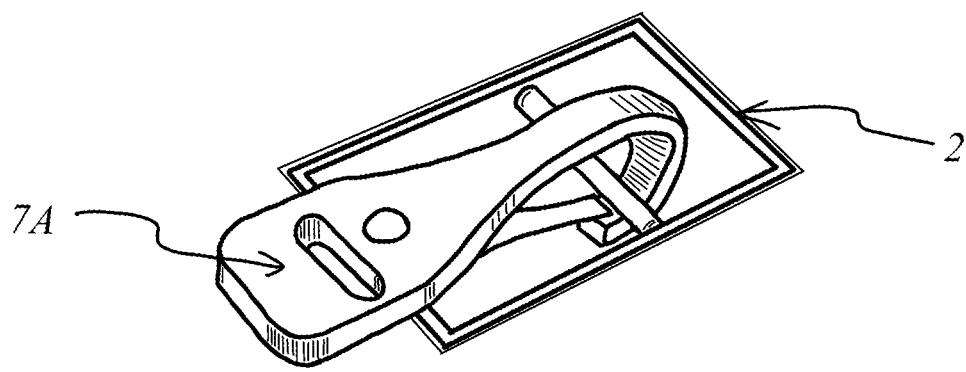
FIG. 6A is an illustrative view of a flat-laying safety hook engaged with a typical vehicle rear seat safety loop used for anchoring child safety seats in the vehicle.
Figure 6B:
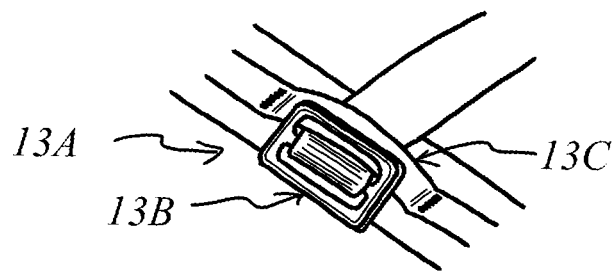
FIG. 6B is an illustrative view of a ladder lock engaged through a short span of fabric such that it can be readily engaged and disengaged, but stays in place when in use and transport.
Figure 6C:
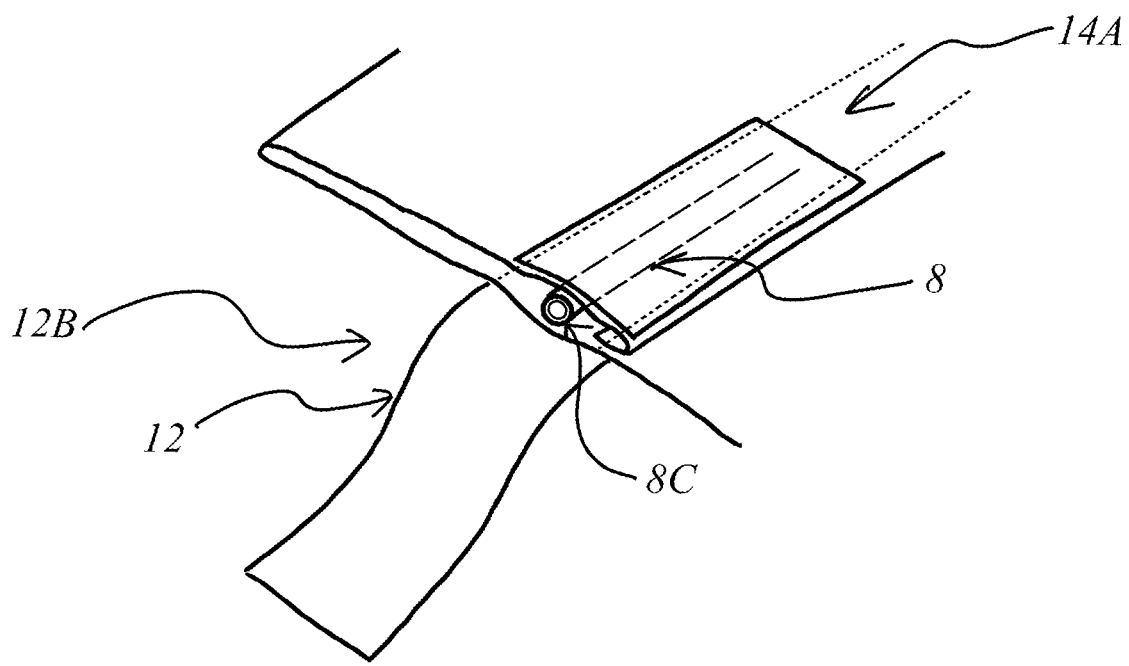
FIG. 6C is an illustrative view of the construction of a tent pole tunnel and the selectively openable backing to prevent sideways motion of the tent pole when closed.

More particularly, when the rear anchoring feature comprises a child seat anchor situated on a backside of a seatback of one or more of the rear seats of the vehicle, the straps 5A and 5B of the rear end connectors can be mounted onto a selected designated mounting location 13C on the panel structure that best aligns the rear end connector with the location of the child seat anchor for securing the rear end connector to the child seat anchor when the rear seats are folded forwardly into a storage position of the rear seats. As shown in FIG. 6B, according to one example, the plurality of designated mounting locations 13C may comprise a continuous strip of material secured to the panel structure at laterally spaced apart locations to define a plurality of loops through which a ladder lock 13B or other suitable buckle structure can be secured removably and adjustably.

The front end connectors of the support system are typically adapted for securement relative to a front anchoring feature on the vehicle that is at an elevated location spaced above the upper supporting surface of the panel structure when the support system is supported on the vehicle. For example, in the illustrated embodiment the front anchoring feature on the vehicle is a headrest assembly defining headrest support members 3A and 3B that receive the straps 6A and 6B of the front end connectors secured thereon. The straps of the front end connectors are adjustable in length similarly to the straps of the rear end connectors to accommodate various mounting locations within various different vehicle configurations.

In one mounting configuration as shown in FIG. 1, the rear seats 16 of the vehicle are folded forwardly into a storage position such that a backside of the rear seats defines an upper surface of the folded rear seats. In this instance, the panel structure 1 is supported against the upper surface of the folded rear seats 16 such that the upper supporting surface of the panel structure extends forwardly from the upper surface of the folded rear seats and such that the upper supporting surface of the panel structure and the upper surface of the folded rear seats collectively form a continuous supporting platform for supporting a load thereon.

Further Embodiments

In a non-limiting further embodiment the panel structure 1 can be used for rest perpendicular to the direction of the seats, as shown in FIG. 8, when a row of seats or wide seat is available. Using panel structure 1 with an unfolded rear seat, one may modify the end effector 7 to be engageable to a seat belt buckle 2 via a seat belt tongue, a small tube forced between the vertical and horizontal portion of the seat, or a means of attachment such as a knot, magnet, hook, clasp or the like to provide the rear anchoring feature 2. In this instance, the support system can be supported in the vehicle while the rear seats 16 remain in an upright orientation. The rear seats of the vehicle include a seat bottom having an upper seating surface arranged to support a user seated thereon. The panel structure is supported against the upper seating surface of the rear seats such that the upper supporting surface of the panel structure and the upper seating surface of the rear seats form a continuous supporting platform. The rear end connectors in this instance are joined to rear anchoring features such as seat belts or child seat anchors of the type that are situated at a rear end of the upper seating surface of the rear seats 16. In this instance the front end connectors remain joined to the front anchoring features 2 on the vehicle at a location spaced above the upper supporting surface of the panel structure 1. This arrangement will significantly widen the available resting room across a row of seats or a wide seat. Specific examples of such seating arrangements are in an airplane with multi-row seating or trucks with bench seats.

In a non-limiting further embodiment the rearward anchoring feature 2 may be various common vehicle features such as headrest posts, ceiling handles, trunk features, tailgate features, tie-down hooks, seat crevices, seatbelt buckles, seat belt ribbons, or the like. The end effector 7 may be made of various constructions to allow anchoring such as a knot, loop, rigid tube, hook, clasp, carabiner magnets, or the like. In a non-limiting example, one may close a trunk or tailgate on rear adjustable strap 5 to provide an anchoring feature.

Similarly, in a non-limiting further embodiment the forward anchoring feature 3 may include the steering wheel, ceiling handles, sun visor supports, rear-view mirror, seat belt strap, seat belt mechanism, or the like. The front adjustable strap 6 may include an end effector similar to the rear adjustable strap to allow anchoring to the forward anchoring features described above. The end effector could be a knot, loop, rigid tube, hook, clasp, carabiner, magnet, or the like.

In a non-limiting further embodiment rigid members 8 & 9 could be constructed with one or more one-way joints allowing for positive angle of rotation in one direction and no angle of rotation in the opposite direction. If these are oriented such that they transmit compressive forces with a downward force of the user, but can be folded, advantageously to 180 degrees, with an upward force, the entire panel structure 1 and rigid members 8 and 9 can fold for storage and the invention requires no disassembly to be stored in a compact form.

In a non-limiting further embodiment the entire panel structure 1 could be made of a series of substantially parallel thin rigid members coupled together sequentially via ties such that the panel structure can be rolled up for storage and unrolled for installation and use. The series of substantially parallel rigid members can advantageously withstand compressive forces and substantially equally share the load of the panel structure 1 amongst the forward and rearward anchoring features, maximizing user comfort.

In a non-limiting further embodiment the entire panel structure 1 could be made from a plastic with relatively high elastic strain capability. Materials such as polyethylene, when thin, can be rolled upon themselves, unrolled for use, and transmit moderate compressive forces laterally when compared to most fabrics. In this non-limiting embodiment rigid members 8 and 9 are not required.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. A support system for a highway passenger vehicle including at least one front seat, at least one rear seat spaced rearwardly of the at least one front seat to define a gap between the at least one front seat and the at least one rear seat, a front anchoring feature at a forward side of the gap and a rear anchoring feature at a rear side of the gap, the system comprising:
a panel structure comprising a sheet of flexible material arranged to span the gap from a front portion of the panel structure at the at least one front seat to a rear portion of the panel structure at the at least one rear seat of the vehicle, the panel structure defining an upper supporting surface spanning an upper side of the panel structure for supporting a load thereon;
one or more front end connectors joined to the front portion of the panel structure and arranged for connection to the front anchoring feature of the vehicle;
one or more rear end connectors joined to the rear portion of the panel structure and arranged for connection to the rear anchoring feature of the vehicle; and
a supporting arrangement providing support to laterally opposing side portions of the panel structure to resist inward displacement of the laterally opposing side portions of the panel structure towards one another when supporting the load on the upper supporting surface of the panel structure;
wherein the supporting arrangement comprises a forward rigid member arranged to be supported under compression laterally of the panel structure between opposing ends of the forward rigid member;
wherein the forward rigid member comprises an elongate pole coupled to the panels structure in proximity to the front portion of the panel structure, the elongate pole being collapsible in length between the opposing ends;
wherein the panel structure is foldable upon removal of the supporting arrangement from the panel structure; and
wherein the panel structure captures the opposing ends of the forward rigid member thereon whereby lateral tension of the panel structure is transferred to a compressive load on the forward rigid member between the opposing ends of the forward rigid member.

2. The system according to claim 1 wherein the one or more front end connectors are joined to the panel structure at respective mounting locations spaced laterally inwardly from the laterally opposing side portions of the panel structure.

3. The system according to claim 1 wherein one of the opposing ends of the forward rigid member is captured by a backing panel which is operable between a working position capturing the end of the forward rigid member relative to the panel structure so as to transfer the lateral tension of the panel structure to the compressive load on the forward rigid member and a released position allowing the forward rigid member to be removed from the panel structure.

4. The system according to claim 1 wherein the forward rigid member is removably supported on the panel structure.

5. The system according to claim 1 wherein the forward rigid member is collapsible in length from a working position to a storage position.

6. The system according to claim 5 wherein the forward rigid member is readily collapsible by folding opposing end portions of the forward rigid member towards one another in a first direction of folding from the working position and resists folding of the opposing end portions of the forward rigid member towards one another in a second direction of folding from the working position.

7. The system according to claim 1 wherein the panel structure protrudes forwardly beyond the forward rigid member and wherein the one or more front end connectors are connected to the panel structure at a location spaced forwardly from the forward rigid member.

8. The system according to claim 1 wherein the supporting arrangement further comprises a rear rigid member spanning laterally under compression between the laterally opposing side portions of the panel structure in proximity to the rear portion of the panel structure.

9. The system according to claim 8 wherein the panel structure protrudes rearwardly beyond the rear rigid member and wherein the one or more rear end connectors are connected to the panel structure at a location spaced rearwardly from the rear rigid member.

10. The system according to claim 1 wherein said one or more rear end connectors comprises a strap member which is adjustable in length.

11. The system according to claim 1 wherein the rear anchoring feature is located on the at least one rear seat of the vehicle and wherein the one or more rear end connectors are arranged to be secured to the rear anchoring feature on the at least one rear seat of the vehicle.

12. The system according to claim 1 wherein the rear anchoring feature comprises a child seat anchor of the vehicle situated rearwardly of a seating surface of the one or more rear seats of the vehicle and wherein the one or more rear connectors is adapted to mount onto the child seat anchor when the at least one rear seat is folded forwardly into a storage position of the at least one rear seat of the vehicle.

13. The system according to claim 12 wherein the one or more rear end connectors is arranged to be releasably mounted onto the panel structure at any selected one of a plurality of designated mounting locations laterally offset from one another across a width of the panel structure.

14. The system according to claim 1 wherein the front anchoring feature is located on the vehicle at an elevated location spaced above the upper supporting surface of the panel structure when the support system is supported in the vehicle.

15. The system according to claim 14 wherein the front anchoring feature on the vehicle comprises a headrest assembly on said at least one front seat of the vehicle.

16. The system according to claim 1 wherein said one or more front end connectors comprises a strap member which is adjustable in length.

17. The system according to claim 1 in combination with the vehicle wherein the at least one rear seat is folded forwardly into a storage position such that a backside of the at least one rear seat defines an upper surface of the folded at least one rear seat, the system further comprising:
   the panel structure being supported against the upper surface of the folded at least one rear seat;
   the upper supporting surface of the panel structure extending forwardly from the upper surface of the folded at least one rear seat; and
   the upper supporting surface of the panel structure and the upper surface of the folded at least one rear seat forming a continuous supporting platform.

18. The system according to claim 1 in combination with the vehicle wherein the at least one rear seat includes a seat bottom having an upper seating surface arranged to support a user seated thereon, the system further comprising:
   the panel structure being supported against the upper seating surface of the at least one rear seat such that the upper supporting surface of the panel structure and the upper seating surface of the at least one rear seat form a continuous supporting platform;
   the one or more rear end connectors being joined to the rear anchoring features at the rear of the upper seating surface of the at least one rear seat; and
   the one or more front end connectors being joined to the front anchoring features at an elevated location spaced above the upper supporting surface of the panel structure.

* * * * *